United States Patent [19]

Cares

[11] Patent Number: 4,490,341

[45] Date of Patent: Dec. 25, 1984

[54] FLUE GAS DESULFURIZATION PROCESS

[75] Inventor: W. Ronald Cares, Houston, Tex.

[73] Assignee: The M. W. Kellogg Company, Houston, Tex.

[21] Appl. No.: 528,491

[22] Filed: Sep. 1, 1983

[51] Int. Cl.$^3$ ............................................. C01B 17/00
[52] U.S. Cl. ..................................... 423/242; 423/169
[58] Field of Search .......... 423/242 A, 242 R, 244 A, 423/244 R, 169

[56] References Cited

U.S. PATENT DOCUMENTS

| | | | |
|---|---|---|---|
| 2,155,139 | 4/1939 | MacIntire | 423/169 |
| 3,883,639 | 5/1975 | Cronkright et al. | 423/242 |
| 3,919,393 | 11/1975 | Selmeczi | 423/242 |
| 4,246,245 | 1/1981 | Abrams et al. | 423/242 |

OTHER PUBLICATIONS

Steen, Li, Rogan, "Half-Calcination of Dolomite at High Pressures", Environmental Science & Technology, vol. 14, No. 5, May 1983, pp. 588-589.

Primary Examiner—Gregory A. Heller

[57] ABSTRACT

A wet scrubbing process for desulfurization of waste gas which employs calcium carbonate reactant in the presence of a magnesium compound wherein the magnesium compound is obtained from partially calcined, magnesium-containing limestone.

5 Claims, 1 Drawing Figure

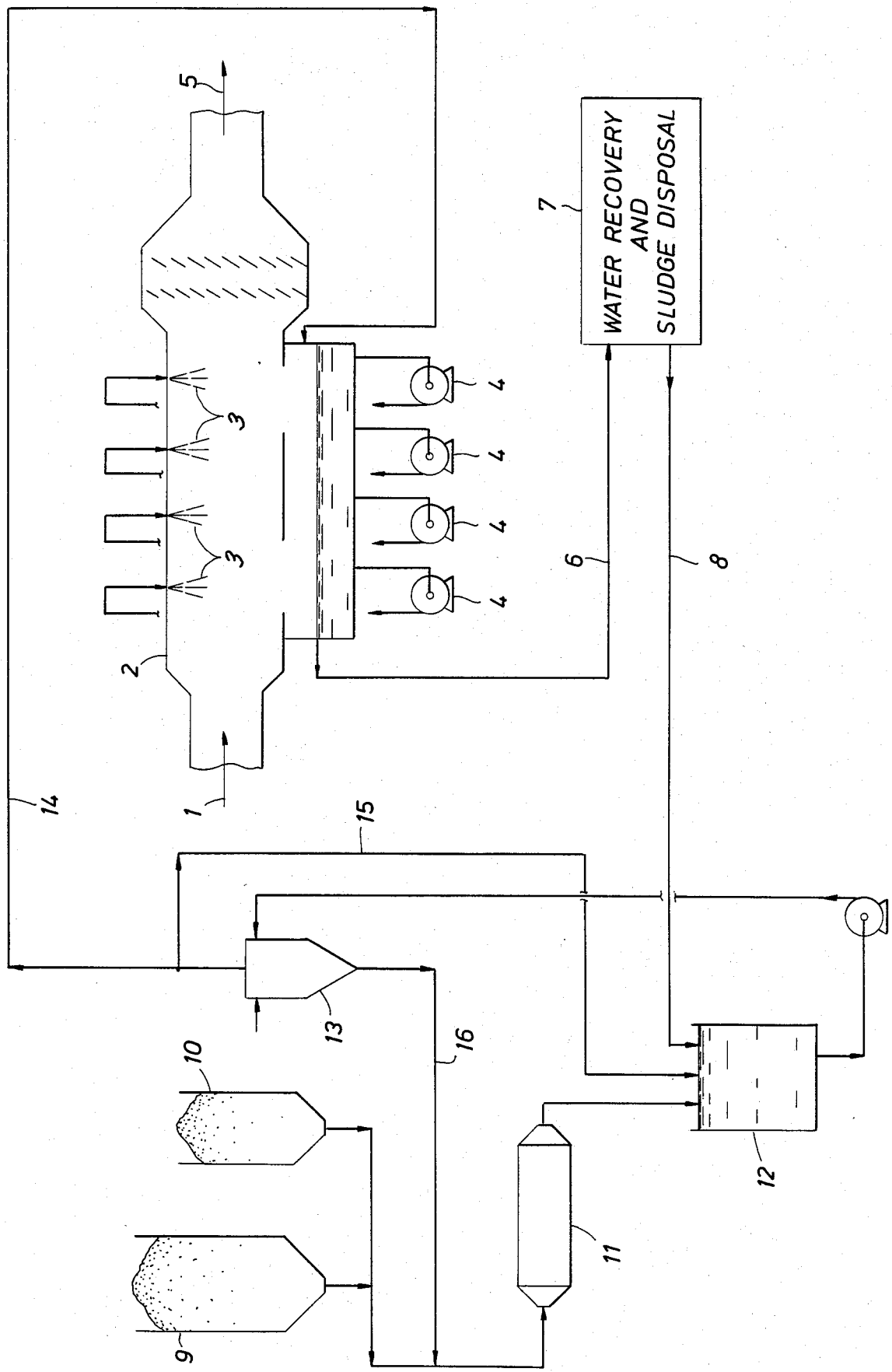

FLUE GAS DESULFURIZATION PROCESS

This invention relates to removal of sulfur dioxide by wet scrubbing with an aqueous medium containing calcium carbonate. More particularly, the invention relates to magnesium promoted limestone slurry systems for gas desulfurization, for example, flue gas desulfurization in steam power plants employing processes similar to that described in U.S. Pat. No. 3,883,639.

Flue gas desulfurization systems are well-known commercially. These systems employ a gas-liquid contactor or scrubber which may be one or more vertical spray towers, venturi scrubbers, or horizontal cross-flow scrubbers such as that described in U.S. Pat. No. 4,269,812. Crushed limestone is a desirable reactant in such systems owing to its low cost and wide availability. Regrettably, limestone dissolution in water proceeds slowly and, because of limited calcium ion content in the scrubbing slurry or aqueous medium, large amounts of slurry must be circulated and limestone utilization and sulfur removal rates are low.

In order to improve performance, many operators employ calcium hydroxide systems which enjoy relatively rapid dissolution rates. However, the operating costs of such system are high because kiln operation required in burning limestone to calcium oxide results in a current price ratio between oxide and carbonate forms of about 10 to 1. This ratio will become larger as the energy cost for kiln operations increases.

The magnesium promoted limestone system of the above recited U.S. Pat. No. 3,883,639 was a significant step in overcoming these problems. The inventors in the U.S. Pat. No. 3,889,638 patent found that addition of a soluble sulfate to an aqueous slurry of calcium carbonate radically increased the dissolution rate of the carbonate. Magnesium sulfate was preferred, again, owing to general availability of suitable magnesium starting materials. The magnesium sulfate is formed in the scrubbing system by reaction of oxygen and sulfur dioxide in the waste gas and magnesium oxide or hydroxide added to the scrubber loop. Ideally, limestone containing both calcium and magnesium carbonates could permit a single reagent system. Regrettably, magnesium in such rock is not quickly dissolved and it has been necessary to add a minor amount of dolomitic lime (magnesium and calcium oxides) to the system in addition to the primary reagent, crushed limestone.

The magnesium promoted limestone system has resulted in high $SO_2$ removal efficiencies as well as high limestone utilization rates. The system does, however, suffer an operating cost penalty from the requirement of kiln operations to produce dolomitic lime. The problem is similar to that of calcium hydroxide scrubbing systems, albeit, of smaller magnitude.

According to the invention, partially calcined, magnesium-containing limestone is introduced to a wet scrubbing process for removal of sulfur dioxide from waste gas wherein the sulfur dioxide is absorbed in an aqueous medium containing calcium carbonate and a magnesium compound.

The partially calcined stone is obtained from naturally occurring rock having from about 5 to about 45 weight percent magnesium carbonate, the balance being predominantly calcium carbonate. Suitable rocks are those chosen from the groups referred to as magnesian limestone containing from 5 to 35 weight percent magnesium carbonate and dolomitic limestone containing from 35 to 46 weight percent magnesium carbonate.

The raw stone is crushed and otherwise prepared for kiln operations and then burned at a temperature within the range from about 590° C. to about 725° C. The specific temperature of kiln operation will vary according to rock composition and source as well as particular kiln practice but will be selected to produce partially calcined stone wherein the calcium component is principally calcium carbonate and the magnesium component is principally magnesium oxide. This result is made possible by the fact that the typical conversion temperature of $MgCO_3$ to $MgO$ is about 100° C. lower than the typical conversion temperature of $CaCO_3$ to CaO. Since the scrubbing process employs magnesium in the oxidic form but can satisfactorily use calcium in the carbonate form, it is readily apparent that significant economies result from use of partially calcined stone. These economies result from the savings in heat otherwise required for burning the calcium component as well as the heat required to bring the kiln batch up to the temperature required for burning the calcium component. Consideration of the latter point leads to preferred use of stones containing at least about 10 weight percent magnesium carbonate with higher magnesium contents being most preferred. The calcination product, partially calcined dolomitic limestone, will contain from about 5 to about 30 weight percent, preferably from about 20 to about 30 weight percent magnesium oxide. The balance will be principally calcium carbonate with lesser amounts of calcium oxide and magnesium carbonate being present.

The scrubbing process employs from about 3 to about 12 weight percent magnesium sulfate in the aqueous medium. Generally, concentrations in the high end of the range are required for high $SO_2$ loadings and stringent removal efficiencies. The amount of MgO added to the process to maintain that soluble sulfate level is largely a function of the process water balance since magnesium sulfate is soluble but is not consumed as a reactant. Therefore, the amount of feed MgO is directly related to water loss in the scrubber sludge handling facility. In general, the amount of magnesium oxide added to the process will be from about 0.2 to about 3 weight percent of the calcium carbonate or calcium carbonate equivalent employed. In practice of the invention, most of the calcium carbonate is introduced to the system as ground, high-calcium limestone while a small amount is introduced as a component, along with the magnesium of the partially calcined, dolomitic limestone. For convenience and good control of operation, the two materials are preferably fed separately to a grinder prior to their common introduction to a slurry tank and the scrubber loop.

Referring now to the FIGURE, waste gas containing sulfur dioxide is introduced 1 to the inlet portion of a horizontal cross-flow scrubber 2 having sprays 3 for contacting the waste gas with aqueous medium containing calcium carbonate in suspension and solution as well as magnesium sulfate in solution. Aqueous medium is circulated through the scrubber by pumps 4. Cleaned gas is withdrawn 5 from the scrubber, reheated, and vented to the atmosphere.

The aqueous medium additionally contains reaction products calcium sulfate and sulfite which are withdrawn from the scrubber along with unreacted calcium carbonate and magnesium sulfate solution and passed via line 6 to the water recovery and sludge disposal systems 7. Typically, these systems include a calcium sulfite oxidation step, slurry thickening, filtration of thickened slurry, and disposal or further treatment of recovered solids. Most of the magnesium sulfate solution is recovered with the water and returned to the scrubbing process via line 8.

The aqueous medium make-up system at the left part of the drawing is directed to preparation of a water slurry comprising calcium carbonate and magnesium oxide which becomes substantially slaked to magnesium hydroxide. The hydroxide, in turn, is quickly converted to ionic magnesium sulfate by reaction with sulfur species in the scrubber. Coarse, high-calcium limestone from bin 9 is combined with partially calcined, magnesium-containing limestone from bin 10 and conveyed to ball mill 11 for intimate mixing and further grinding of the constituents. The ball mill product is then discharged to slurry tank 12 and combined with recovered magnesium sulfate solution from line 8. The resulting slurry is then pumped through wet cyclone 13 and introduced to the scrubber reactor tank via line 14. Part of this flow is recycled to the slurry tank via line 15. Coarse limestone is recovered from the bottom of the wet cyclone and the cyclone underflow is recycled to the ball mill via line 16.

I claim:

1. A process for removing sulfur dioxide from waste gas by a wet scrubbing absorption process comprising passing the waste gas into a reaction zone; contacting the waste gas in the reaction zone with an aqueous medium containing calcium carbonate and a magnesium sulfate; adding an aqueous reactant containing slurry to the reaction zne during the reaction of said waste gas with said aqueous medium, said reactant containing slurry containing a ground, partially calcined naturally-occurring limestone reactant selected from the group consisting of magnesium limestone containing 5 to about 45% weight percent magnesium carbonate and dolomitic limestone containing from 35 to 46 weight percent magnesium carbonate, said limestone reactant having been burned at a temperature within the range from about 590° C. to about 725° to produce a partially calcined product wherein the calcium component thereof is principally calcium carbonate and the magnesium component thereof is principally magnesium oxide, and said partially calcined limestone product thereafter being ground to produce the ground, partially calcined limestone reactant; permitting the waste gas to react with said aqueous medium and slurry in the reaction zone under conditions and for a time to permit the sulfur dioxide to be absorbed therein and thereafter withdrawing the cleaned waste gas from the reaction zone.

2. The process of claim 1 wherein the aqueous medium contains from about 3 to about 12 weight percent magnesium sulfate.

3. The process of claim 1 wherein the partially calcined product contains from about 5 to about 30 weight percent magnesium oxide.

4. The process of claim 1 wherein the partially calcined product is admixed with high-calcium limestone thereafter ground prior to introduction to the scrubbing process.

5. The process of claim 4 wherein the magnesium oxide is from about 0.2 to about 3 weight percent of calcium carbonate introduced to the process.

* * * * *